United States Patent
Smith

(10) Patent No.: US 10,210,482 B2
(45) Date of Patent: *Feb. 19, 2019

(54) LOCATION VERIFICATION USING NETWORKED CLIENT PERIPHERALS

(71) Applicant: Applied Underwriters, Inc., Omaha, NE (US)

(72) Inventor: Justin N. Smith, Woodside, CA (US)

(73) Assignee: Applied Underwriters, Inc., Omaha, NE (US)

( * ) Notice: Subject to any disclaimer, the term of this patent is extended or adjusted under 35 U.S.C. 154(b) by 198 days.

This patent is subject to a terminal disclaimer.

(21) Appl. No.: 15/055,673

(22) Filed: Feb. 29, 2016

(65) Prior Publication Data

US 2016/0180295 A1    Jun. 23, 2016

Related U.S. Application Data

(63) Continuation-in-part of application No. 14/188,944, filed on Feb. 25, 2014, now Pat. No. 9,286,640.

(60) Provisional application No. 61/772,635, filed on Mar. 5, 2013.

(51) Int. Cl.
| | |
|---|---|
| G06Q 10/10 | (2012.01) |
| H04W 4/02 | (2018.01) |
| G06Q 40/00 | (2012.01) |
| H04W 4/029 | (2018.01) |
| G06Q 40/08 | (2012.01) |
| H04W 4/021 | (2018.01) |
| H04W 12/08 | (2009.01) |
| H04L 29/06 | (2006.01) |

(52) U.S. Cl.
CPC ......... *G06Q 10/1091* (2013.01); *G06Q 40/08* (2013.01); *G06Q 40/125* (2013.12); *H04W 4/021* (2013.01); *H04W 4/023* (2013.01); *H04W 4/028* (2013.01); *H04W 4/029* (2018.02); *H04W 12/08* (2013.01); *H04L 63/107* (2013.01)

(58) Field of Classification Search
None
See application file for complete search history.

(56) References Cited

U.S. PATENT DOCUMENTS

| | | |
|---|---|---|
| 8,364,120 B2 | 1/2013 | Kuhlman et al. |
| 8,959,030 B2 | 2/2015 | Ricci |
| 8,977,563 B2 | 3/2015 | Burns |

(Continued)

FOREIGN PATENT DOCUMENTS

WO    WO 2012/110897 A2    8/2012

OTHER PUBLICATIONS

Peretz, Shlomo, PCT Application WO 2012/110897 A2, Verifying the location of a mobile communication device, Aug. 23, 2012.

(Continued)

*Primary Examiner* — Fateh M Obaid
(74) *Attorney, Agent, or Firm* — Mark Nowotarski

(57) ABSTRACT

A system verifies the location of a first person during a specified period by sending random alerts to the smart phone of the first person. A user must respond to the alerts. A second person defines acceptable locations. The smart phone has location measuring capability, such as a GPS or connection to a WAN. The identity of the user can be verified by requiring the input of a security code that also gives the user access to confidential information of the first person.

7 Claims, 1 Drawing Sheet

(56) References Cited

U.S. PATENT DOCUMENTS

| | | | |
|---|---|---|---|
| 9,020,848 | B1 | 4/2015 | Ridge et al. |
| 9,070,162 | B2 | 6/2015 | Cherry et al. |
| 9,154,301 | B2 | 10/2015 | Prehofer et al. |
| 9,250,085 | B2 | 2/2016 | Hwang et al. |
| 2008/0114683 | A1* | 5/2008 | Neveu .................. G06Q 10/06 705/50 |
| 2010/0161462 | A1 | 6/2010 | Pappas et al. |
| 2012/0022897 | A1 | 1/2012 | Shafer |
| 2012/0060112 | A1 | 3/2012 | Wilson et al. |
| 2012/0123806 | A1 | 5/2012 | Schumann, Jr. et al. |
| 2012/0271651 | A1 | 10/2012 | Gilbert et al. |
| 2013/0005352 | A1 | 1/2013 | Jones et al. |
| 2013/0006718 | A1* | 1/2013 | Nielsen ............ G06Q 10/06312 705/7.42 |
| 2013/0024334 | A1 | 1/2013 | Kozlay |
| 2013/0030844 | A1 | 1/2013 | Pendergrass et al. |
| 2013/0085796 | A1 | 4/2013 | Ruffolo |
| 2014/0279672 | A1* | 9/2014 | Liu ....................... G06Q 10/10 705/345 |

OTHER PUBLICATIONS

ADP; ADP Mobile Solutions—Support Page; http://www.adp.com/mobilesolutions/support.aspx; last viewed Jan. 27, 2014.

ADP; ADP Mobile Solutions, Mobile Product Employee, Mobile HR Services; http://www.adp.com/mobilesolutions/employee/; last viewed Jan. 27, 2014.

en.wikipedia.org, Defense Contract Audit Agency; https://en.wikipedia.org/wiki/Defense_Contract_Audit_Agency; last viewed Jan. 29, 2014.

epaysystems.com; Employee Self Service Features; http://www.epaysystems.com/employee-self-service/; last viewed Feb. 19, 2014.

CertusView; e-Sketch, Certus View; http://certusview.com/e-sketch-application/; last viewed Feb. 19, 2014.

ExakTime Mobile; ExakTime Mobile Mobile Time Clock; http://www.exaktime.com/mobile-time-clock; last viewed Jan. 27, 2014.

FLOWFINITY; Security Guard Management; http://www.flowfinity.com/solutions/security-guard-management.aspx 1 of; last viewed Jan. 29, 2014.

True Wireless, Inc.; 4 Mobile Time Clock Apps for Business; http://truewirelessinc.com/mobile-workforce/4-mobile-time-clock-apps-f . . . 1 of; dated May 28, 2013; last viewed Jan. 27, 2014.

android.gadgettouch.com; GPS Punch!-Tracking Ugly, Lazy Employees With This Free Application; http://android.gadgettouch.com/GPS-Punch-Tracking-ugly-lazy-employe . . . 1 of; dated Sep. 20, 2012; last viewed Jan. 28, 2014.

Kronos Incorporated; Workforce Ready Time & Attendance; last viewed Jan. 28, 2014.

Kronos Incorporated; Atlanta Public Schools Interfaces Kronos Timekeeping to Improve Position Control and Workforce Management; last viewed Jan. 28, 2014.

Software Advice, Inc.; Case Study: Kronos Helps Sulco Warehousing & Logistics and Lancer Transportation Manage Employee Time and Attendance; http://new-talent-times.softwareadvice.com/case-study-kronos-0713/; dated Jul. 3, 2013; last viewed Jan. 28, 2014.

The Sleeter Group; Manage Payroll from your iPhone or iPad with Intuit Online Payroll Mobile; http://www.sleeter.com/blog/2011/05/manage-payroll-from-your-iphone- . . . 1 of; dated May 24, 2011; last viewed Jan. 27, 2014.

VDCResearch; Mobile & Wireless Practice; Mobile HR Solutions: Connecting & Empowering Your Workforce; dated May 2011, last viewed Jan. 31, 2014.

American Optometric Association; ARBO releases new OE Tracker mobile app for smartphones; http://newsfromaoa.org/2013/03/22/arbo-releases-new-oe-tracker-mobile . . . 1 of; dated Mar. 22, 2013; last viewed Jan. 28, 2014.

Pacific Timesheet; Contruction Timesheets Track everything in one place!; http://www.pacifictimesheet.com/timesheet_products/pacific_timesheet_ . . . ; last viewed Jan. 29, 2014.

Pacific Timesheet; DCAA Compliance and Sarbanes-Oxley; http://www.pacifictimesheet.com/timesheet_products/pacific_time-sheet_ . . . 1 of; last viewed Jan. 29, 2014.

Freedom Telecare, LLC; Frequently Asked Questions; http://timesheetmobile.com/employee-tracking-frequently-asked-questio . . . 1 of; last viewed Jan. 29, 2014.

TSheets Time Tracker; TSheets We Love Employees; http://www.tsheets.com/crew-time-card-app.php; last viewed Jan. 29, 2014.

Oregon Health & Science University; TTE User Guide; Telephone Time Entry (TTE); Rev. Jan. 2012, last viewed Mar. 8, 2013.

employeetimeclocks.com; uAttend SmartPhone iPunch App SmartPhone Punch Clock; http://www.employeetimeclocks.com/prdct523-uattend-iphone-android-a . . . 1 of; last viewed Feb. 19, 2014.

WKRCOMPLLC; Workers' Compensation iPhone APP Calculator; http://www.wkrcomp.com/app.php; last viewed Feb. 19, 2014.

en.wikipedia.org; Poisson process; https://en.wikipedia.org/w/index.php?title=Poisson_process&oldid=466984482; last viewed Nov. 21, 2014.

* cited by examiner

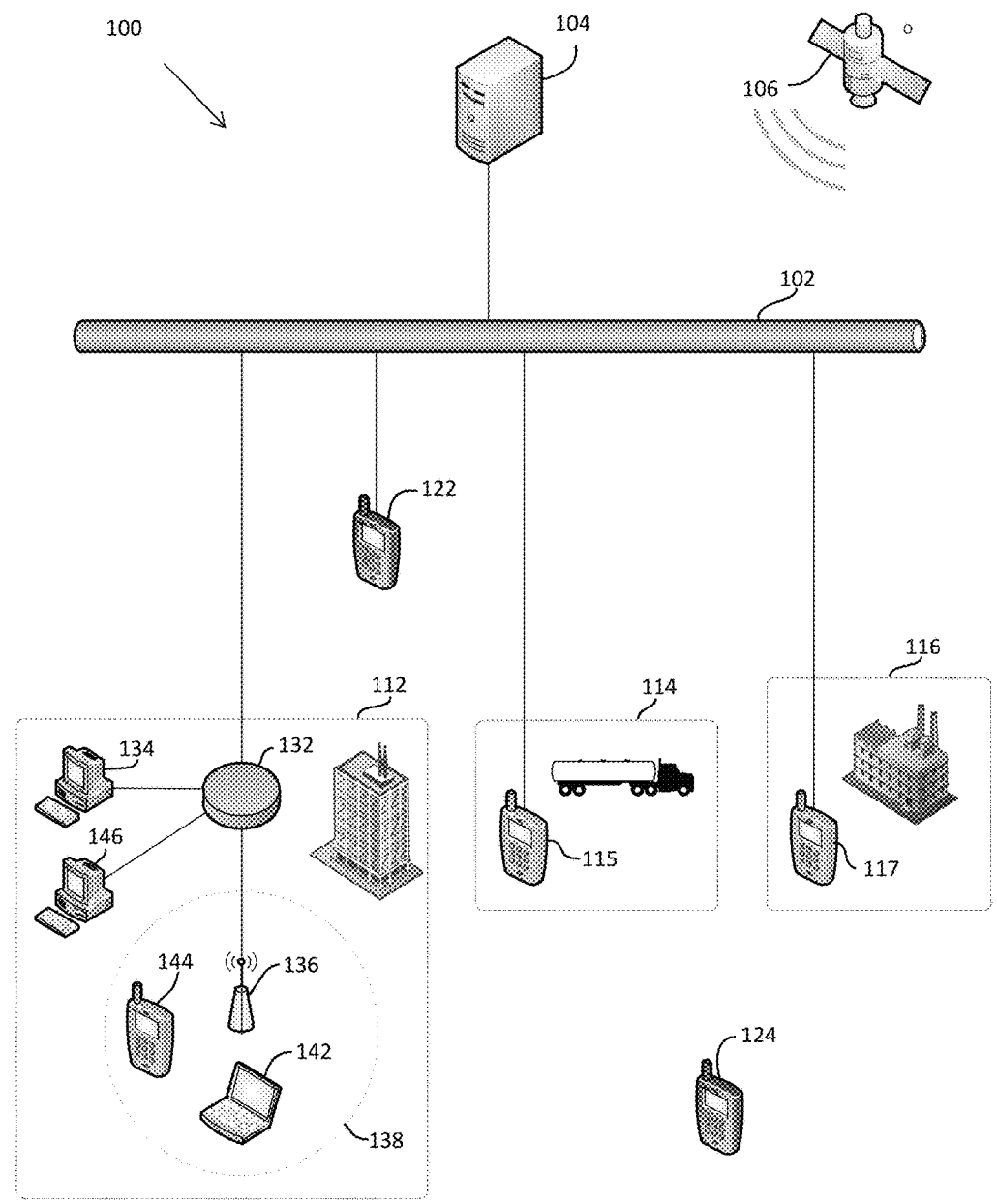

LOCATION VERIFICATION USING NETWORKED CLIENT PERIPHERALS

COPYRIGHT AND TRADEMARK NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

BACKGROUND OF THE INVENTION

Smartphone Attendance Monitoring

Payroll companies provide payroll services to one or more client companies. A client company's employees are usually expected to work at defined locations between certain times. The location may be within an office, a factory, or some other defined area. Monitoring actual attendance is difficult. Moreover, specific locations and times of attendance may have a complicated relationship with the wages and benefits earned, especially for hourly paid employees.

A typical payroll company will allow a client to specify workers and job locations, but will require direct input of data on hours worked by employee by pay period at various locations, with separation of hours into various time codes, such as: regular, overtime, or double-time. Separate time-management software is available which can compute these aggregates from records of more basic data on clock-in and clock-out times. Some payroll companies may even have software that combines time-management tools with payroll data collection and processing.

Time management systems are easiest for the client company to use when employees themselves can perform clock-in and clock-out events using a system which collects this data centrally. However, to date this has only really been practical for employees in office environments who work at networked computers all day. Software can be put on the networked computer to handle the clocking events and if the software cannot be installed elsewhere, there is some limited assurance that the employee who is supposed to be doing the work is the one who is clocking in and out.

However, many workers do not work at computers often. This includes many types of workers with complicated payroll requirements, for example construction workers, electricians, and other blue collar trades. The complications for these workers start with overtime calculations. Rules regarding overtime and other shift payments are often complex. Overtime may include hours worked beyond a set total per day as well as per week or pay period, and may also include hours worked outside a preset shift or hours beyond a certain continuous interval without a break. Many of these workers divide their time between jobsites which may have different payroll-related requirements. For example, workers near a State boundary may work some hours in a neighboring State, and may be subject to different reporting requirements by State.

Requirements may also be complicated within States. For example, workers' compensation premiums for many construction workers in New York State must be computed differently based on the number of hours worked in each county. Minimum wage requirements vary by state, county and sometimes also municipality, and must typically be obeyed for the work done in each location. Recording and entering all the required data for such workers is typically onerous. There is a need therefore, for a system that will verify whether or not a worker is actually on the job in variable and remote locations.

SUMMARY OF THE INVENTION

FIG. 1 shows the various possible relationships 100 between physical devices used in a proposed payroll management processes. Horizontal bar 102 represents the internet. Direct internet connections (wired or wireless) are shown by solid connecting lines. Above the horizontal bar are a payroll company's server 104 and third party satellite(s) 106 used in a location checking process. Said server may be referred to as a first server. Said payroll company may be referred to as a second person. All items shown below the horizontal bar are located with the client company's employees. Any one of said employees may be referred to as a first person. The items may be owned by the client, or by the employees, or by a payroll company. Ownership of the devices is unimportant. Special software which may be owned and distributed by the payroll company may be used to configure the various devices to perform the required tasks. Items in 112, 114 and 116 are exemplary employee work locations. Items 122 and 124 are telecommunication devices that are with employees when they are at work. Specific labeled items are:

- The payroll company's central server 104 comprising a store of master payroll and benefit records, linked as needed to other payroll company systems for billing, printing, insurance management, etc.
- The internet 102 or other computer-to-computer communications network, such as M-2-M, digital cell phone, analog cell phone, wired, fiber optic, or other network. As used herein, a "computer" refers to a digital electronic device that comprises a microprocessor, input device, output device, permanent memory and computer readable instructions stored within said permanent memory, said computer readable instructions being able to cause said microprocessor to read in data from said input device, process said input data and generate output data to control said output device. Servers, smart phones, and all digital computing devices described herein comprise a computer.
- A client employee's smartphone 122 with an active internet link but not located at a defined jobsite.
- A client employee's smartphone 124 without an active internet link and not located at a defined jobsite.
- A client's truck 114 driven by an employee with a smartphone 115 in his/her possession.
- A client's factory 116 where an employee is at work with his/her smartphone 117.
- A client's office location 112 where various employees and peripherals are located.
- A local area network (LAN) hub 132 located in the client's office. All peripherals connected to this hub can be considered to be at a work location.
- An employee's work computer 134 connected to the LAN at his/her office.
- A Wi-Fi hub 136 (WAN) connected to the office LAN. Peripherals connected to the Wi-Fi hub can be considered to be at a work location.
- The limit range 138 of the Wi-Fi network.
- An employee's computer 142 connected to the WAN.
- An employee's smartphone 144 connected to the WAN.
- A client manager's computer 146 connected to the LAN.

A satellite 106 forming part of a location tracking system, such as GPS, which can be used by smartphones and similar peripherals.

BRIEF DESCRIPTION OF DRAWINGS

FIG. 1 is a schematic of a system for monitoring employee location.

DETAILED DESCRIPTION

The detailed description describes non-limiting exemplary embodiments. Any individual features may be combined with other features as required by different applications for at least the benefits described herein. As used herein, the term "about" means plus or minus 10% of a given value unless specifically indicated otherwise.

Smartphone Attendance Monitoring

A way around the difficulties described herein is to put attendance management software on smartphones or other personal programmable communications devices which employees then keep in their possession while they work. Most employees already carry sufficiently capable smartphones. The software controlling said smartphones will do the following:

1. The software will allow the employee to "clock in" and "clock out" when the phone is within a defined acceptable area and time shift. "Clocking in" means a first person has indicated that said person has begun work or other task. "Clocking out" means that said first person has ceased said work or task.
2. The software will send all collected data via an internet or telephone connection to the payroll company's server (i.e. the "first server").
3. The payroll company's server will collect all data and send necessary data and reports back to the client and its employees. Data may be transmitted directly from one client peripheral to another insofar as those peripherals form part of the internet link. All communication through such peripherals will be encrypted to prevent the client from bypassing any system controls.
4. The employer (aka a "second person") may define acceptable location areas for working, for example, by drawing perimeters on a map in software maintained by the payroll company, or by specifying acceptable network connections to, for example, Wi-Fi servers located at a job site.
5. The employer may also define schedules for each employee.
6. Presence of a first person within an acceptable area may be assessed in one of the following ways or combinations thereof:
   a. The phone (or similar device) may have access to a satellite-driven location system, such as GPS, which the software on the phone will access, then compare against the perimeters of said acceptable location area.
   b. The phone may allow the software to use triangulation data from local cellphone towers, which the software will compare against the acceptable perimeters.
   c. The phone may connect to a Wi-Fi or wired network which the employer has designated to be acceptable. For example, a Wi-Fi network operating within a warehouse building. Such networks are especially useful because they often exist in locations where wireless phone, GPS or other external wireless signals are inaccessible. These locations include strongly constructed concrete buildings or other buildings which are shielded from said external wireless signals. They also include routes that a worker should be on that is shielded from GPS signals by large buildings.
7. The specific phone location will be monitored at regular short intervals between clock-in and clock-out events, and transmitted automatically to the payroll company's server. Time spent within each significant area for payroll purposes will be computed automatically by a machine attached to the payroll company's server. The amount of "clocked" time spent outside defined worksites will be transmitted to the client, so said client can consider taking action against employees who spend too much time away from work.
8. A surprising benefit of collecting this data for the client is a possible reduction in workers compensation (WC) liabilities and fraud. To be compensable under WC rules, an employee must suffer injury arising in the course of and arising out of their work. So, an employee would generally be covered for injuries suffered while traveling between assigned worksites. Said employee would not be covered if he/she made a detour, for example, on the way to run a personal errand. The location data tracked by the software could be used to identify such injuries that were not in an acceptable work area.
9. A further surprising benefit of the system derives to the payroll company directly. Hours to be worked may be required to be scheduled in advance and sent to employees' devices via the payroll company's server. The payroll company will then have advance notice before any employee is employed. This prevents a common type of fraud whereby an employer pays a worker "under the table" unless and until that worker is injured and wishes to make a WC claim, at which point the employer announces to the payroll company and WC insurance provider that the worker has "just" been hired.

While much of the description above supposes the use of smartphones as the peripherals carried by employees, other personal programmable communications devices could be used including smart watches, tablet computers, or laptop computers. Similar software could also be rolled out for desktop computer users so that all of a client's employees have access all the time to the payroll system through the peripheral that would typically be their "computer of choice". This includes regular office workers who typically sit at desktop computers, and workers who sometimes travel and sometimes stay at their desk, such as supervisory staff. Analog systems may also be used with proper circuitry design to provide the above described functionality without digital programming.

Mobile Employees and Distance Traveled

Certain employees do not work at fixed worksites. These include, for example, traveling salesmen and truckers. These employees pose unique challenges and opportunities to the system.

1. Many smartphones, tablet computers and other peripherals have access to satellite-driven location-tracking systems such as GPS. A module could be added in to the payroll company's software to allow specifying routes by an employer (i.e. a second person) which an employee (i.e. a first person) should follow on the job. For example, a trucker might be expected to drive from San Francisco to Phoenix on a given day. GPS tracking data recorded by the software in the trucker's smartphone could be used to monitor completion of assigned routes.
2. Timekeeping along a set route may or may not be important to the client. Some employees are paid piece rates by distance traveled. For these employees, data from a vehicle odometer is often used to compute wage amounts, and would likely be preferred over data from the smartphone. The smartphone could still be used to find employee locations at any given time, and to provide data which is readily accessible to systems which prepare performance management reports.
3. Some employees are expected to travel as far as possible but do not have set routes, or have very complex routes. These employees may or may not be in vehicles equipped with odometers. For example, this category includes security guards, local delivery drivers, tractor drivers, yard workers, and cleaning staff. For these workers, the client may specify that the payroll company's server produce a regular report which breaks down the total distance traveled by employee by pay period.
   a. This category of employee may include some who are expected to be mobile, but within a large jobsite, such as field workers on a farm. These workers could be subject to distance-traveled reporting and also worksite attendance checking.
4. Additional benefits from data on distance traveled may accrue through the WC rate setting process. The benefits include:
   a. Using data on distance traveled by employees, it may be possible to identify subclasses of employees within traditional workers' compensation rating classes which have a characteristically greater or lesser exposure to risk of injury in accordance with differences in travel distance or pattern. For example, it might be found that pizza delivery workers travel further and faster than other delivery drivers.
   b. Using data on distance traveled by employees, the payroll company can check for undesirable work patterns and fraud by the client in the description of its business and the activities of its employees. To continue the prior example, if a pizza shop has described itself as not doing any delivery, then its workers should not travel far on the job. Material inaccuracies in descriptions given to the insurer in the initial application for insurance may be sufficient grounds for cancellation or non-renewal of the client, which provides a benefit via reduced losses to the insurer.

Employee Access to Payroll and Benefit Data

Since every employee of the client will have software from the payroll company on a peripheral device in their possession with some access to the payroll company's server, it is natural to provide some employee access to wage and benefit data. This would typically include schedules, hours worked, wages earned, or benefits accrued. This personal information is typically kept confidential to an employee. By "confidential to a person" (e.g. an employee) it is meant at least that the information is not available through a simple search of the internet, such as using a Google search engine. Providing this personal financial data may have a surprising side benefit. The employee will need to have a method to verify his/her identity to access such data, which may be a PIN or password or similar standard protocol comprising personal security code.

For various actions within the payroll system, an employer needs to ensure that the employee is performing said various actions and not another user fraudulently acting on said employee's behalf. These actions include clocking in, clocking out, and responding to audit inquiries. By using the same login protocol for these actions as for access to the employee's confidential personal data, said fraud can be substantially discouraged. Most employees will weigh the cost of providing access to their confidential personal data as being larger than the benefit of being able to defeat the attendance-checking routines.

Active Attendance Audits

So far we have simply presumed that employees remain present with the peripherals used to monitor their location throughout the periods of time when they are recorded as being in attendance. We can add mechanisms to encourage full attendance by auditing this behavior.
1. The payroll company server may at intervals send a message to the employee's peripheral, which causes the software on that peripheral to issue an audible and/or visible alert to the employee. The employee must respond by entering a secret code within a specified time interval. If the code is not entered, the employee's attendance will be provisionally struck out and the employer will be informed.
2. The employer may choose any action, including letting the strike-out stand or overturning it, and/or implementing their own separate punishment actions.
3. The time allowed for entry of the secret code should be long enough to allow for workers to put down tools safely or return from a short break. Ten minutes is adequate in many situations, although this and other parameters could be variable by employee at the second person's (e.g. employer's) discretion. Said functionality can be built into the first server (e.g. payroll server).
4. The secret code should be one that employees will not willingly share with their fellows, to discourage fraud. Suitable codes would include: the employee's SSN; or the PIN or password used to access the employee's payroll and benefit data in the payroll company's system or other confidential financial data.
5. The interval between messages being sent out could be random, following, for example, a Poisson process, where the Poisson parameter is settable by employee or employee type and is under the ultimate control of the second person (e.g. employer) and not the first person (e.g. the employee) This can be implemented by setting various permissions in the first server.
6. Messages could also be sent out at specific times as requested by the client.
7. The client's manager's access to the payroll company's software would include tools for managing and monitoring the results of attendance audits.

Miscellaneous Considerations

All data communications from client peripherals to the payroll company's server should be strongly encrypted.

I claim:

1. A system directed to automatically verifying whether or not an employee is actually on a job in variable and remote locations, said system comprising:
   a) a personal programmable communications device that is with said employee when said employee is on said job; and
   b) a first server;
   wherein:
   c) said personal programmable communications device is controlled by computer readable instructions stored on a permanent memory to carry out the steps of:
      1) allowing a user access to said device after said user inputs a personal security code that is confidential to said employee;
      2) receiving from said user a clock-in command at a clock-in time;
      3) receiving from said user a clock-out command at a clock-out time;
      4) transmitting to said first server said clock-in time and said clock-out time;
      5) receiving from said first server after said clock-in command but before said clock-out command, a first message which causes said personal programmable communications device to issue an audible alert;
      6) receiving from said user said personal security code within a specified time interval after said first message; and
      7) sending to said server a notice if said personal security code is not received in said time interval;
   d) said first server is modified to automatically carry out the step of transmitting a second message triggering an audible alert to said personal programmable communications device at a random interval after said first message, said random interval being determined by a Poisson process wherein said Poisson process is controlled by a Poisson parameter;
   e) said personal programmable communications device is modified to:
      1) receive from said user said personal security code within said specified time interval after said second message; and
      2) send said first server a notice if said personal security code is not received from said user after said specified time interval after said second message;
   f) said system is further directed to verifying that said employee is in an acceptable location area after said clock in time and before said clock out time wherein:
      1) said first server is controlled by computer readable instructions stored in a permanent memory to carry out the step of receiving from an employer of said employee a definition of said acceptable location area for said employee; and
      2) said steps controlling said personal programmable communications device further comprise the step of automatically verifying said user is within said acceptable location area using location sensing technology when said personal security code is received after said first message; and
   g) said system is further directed to verifying that said employee is in said acceptable location area when said acceptable location area comprises the interior of a building shielded from external GPS signals but covered by an internal Wi-Fi network, wherein said verification comprises the step of connecting said personal programmable communications device to said Wi-Fi network and verifying the location of said employee thereby.

2. The system of claim 1 which is further directed to verifying that said employee is in said acceptable location area when said acceptable location area comprises a route that is shielded from GPS signals by large buildings, wherein said verification comprises the step of connecting said personal programmable communications device to a Wi-Fi network said employer has deemed acceptable.

3. The system of claim 1 which is further directed to ensuring said employee is performing said clock in and clock out actions and not another user fraudulently acting on said employee's behalf, wherein said steps controlling said personal programmable communications device further comprise allowing said user to have access to confidential information of said employee through said personal programmable communications device upon receipt of said personal security code by said first server.

4. The system of claim 3 wherein said confidential information comprises confidential financial data of said employee.

5. The system of claim 1 which is further directed to ensuring that an employer of said employee, and not said employee, sets said Poisson parameter, wherein said first server is modified to allow said Poisson parameter to be set upon receipt of one or more permissions assigned to said employer.

6. The system of claim 4 wherein said confidential financial data of said employee comprises said employee's wage and benefit data.

7. The system of claim 1 which is further directed to allowing said employee enough time to put down tools safely in order to respond to one of said audible alerts, wherein said specified time interval is set to about 10 minutes.

* * * * *